July 15, 1969   H. A. McMASTER ET AL   3,455,669
APPARATUS FOR HEAT TREATING GLASS ON A FLUID SUPPORT
Filed May 9, 1966   2 Sheets-Sheet 1

INVENTORS
Harold A. McMaster
& Ronald A. McMaster

Barnard, McKlynn & Leising
ATTORNEYS

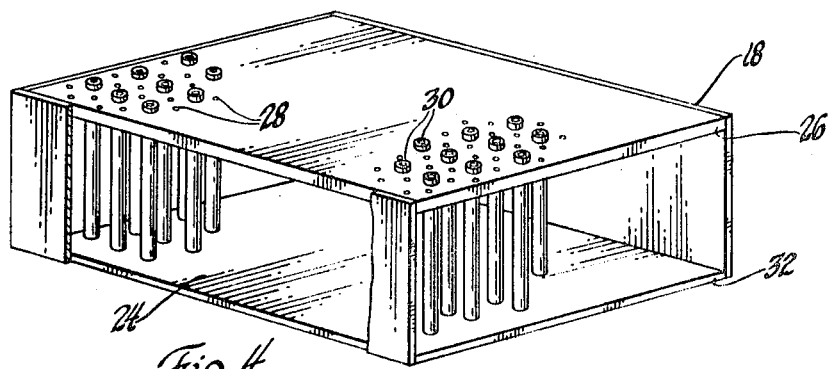
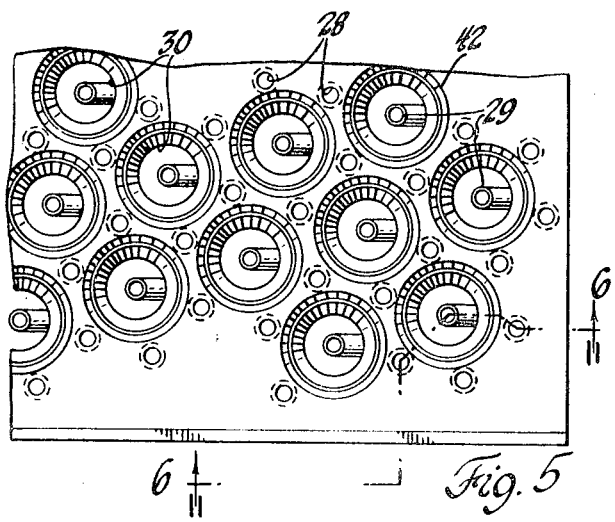
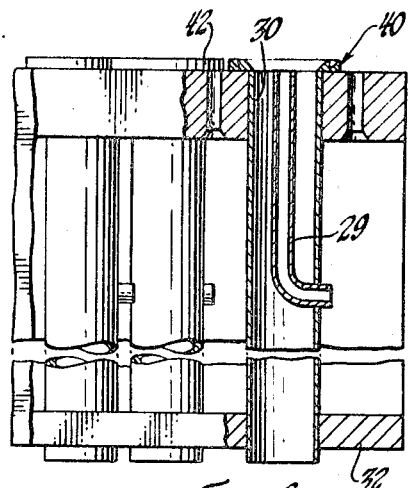
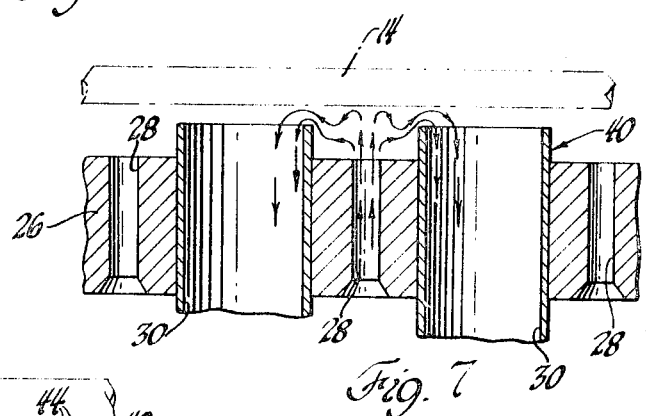
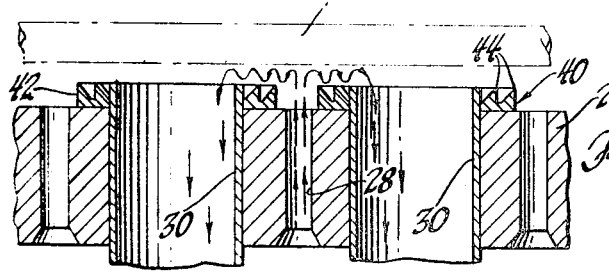

3,455,669
APPARATUS FOR HEAT TREATING GLASS
ON A FLUID SUPPORT
Harold A. McMaster, Woodville, and Ronald A. McMaster, Genoa, Ohio, assignors to Permaglass Inc., Woodville, Ohio, a corporation of Ohio
Filed May 9, 1966, Ser. No. 548,532
Int. Cl. C03b 27/00, 39/00
U.S. Cl. 65—182                                               7 Claims

ABSTRACT OF THE DISCLOSURE

An apparatus for transferring heat between a sheet of glass and fluid including flow control means having at least one surface with a plurality of inlet passages disposed in the surface for initially impinging fluid against the sheet. A plurality of exhaust passages are disposed in the surface and there is included means comprising either a tube-like member, or an annular member having ridges therein, or the combination of both, disposed about each exhaust passage to project into the flow of fluid for subsequently impinging the fluid on the sheet as the fluid flows from the inlet passages to the exhaust passages.

---

The instant invention relates to a method and apparatus for transferring heat between a sheet of glass and a fluid and, more specifically, to a flow control means for impinging fluid on a sheet of glass as it is ejected from a plurality of inlet passages and for subsequently causing the fluid to again impinge on the sheet as it flows to a plurality of exhaust passages thereby greatly increasing the heat transfer from the sheet to the fluid.

In tempering a sheet of glass, it is desirable to uniformly temper the glass over the entire surface thereof, but in order to accomplish such a uniform temper, it is necessary to establish a uniform heat transfer rate from the glass to the fluid over the entire area of the glass being subjected to fluid. The tempering of glass depends on, among other factors, the impingement of cool fluid against the glass sheet. A maximum amount of heat is transferred from the glass to the fluid when the fluid impinges against the glass. That is to say, when the fluid is not impinged against the glass, as when the fluid travels parallel to the glass, an insulating boundry layer of fluid is formed on the glass surface and greatly reduces the heat transfer from the glass to the fluid.

It is, therefore, desirable that a sheet of glass be subjected to impinging cool fluid over the entire surface thereof to accomplish the uniform tempering over the entire surface of the glass. This, however, is not possible in that a large area of glass cannot be simultaneously impinged by fluid flow because there must be an exhaust route for the fluid to follow after it has impinged the glass. Clearly, if a large area of a sheet of glass is simultaneously impinged with fluid, the fluid, after having impinged the glass, moves parallel to the glass to flow to an area of low pressure, hence forming an insulating boundry layer of fluid at the surface of the glass, which in turn reduces the impingement and prevents a uniform tempering over the entire surface of the glass.

Apparatuses of the type heretofore utilized for tempering glass have, therefore, utilized a plurality of inlets to impinge fluid upon the glass and a plurality of exhausts interspaced among the inlets so that once the fluid has impinged the glass, it moves to the exhausts. In such apparatuses, impingement of the cool fluid upon the glass occurs only in the areas where the cool fluid is being ejected from the inlets. Normally, the fluid impinges the glass and flows laterally or parallel to the glass to the exhausts, and such parallel flow frequently establishes an insulating boundry layer film on the glass surface to prevent adequate tempering of the glass. In order to increase the area of impingement in the previous apparatuses, the number of inlets is maximized. However, the number and aggregate area of the inlets is limited by the requirement to have a sufficient number of exhausts with a sufficient aggregate area to provide an adequate low pressure area to which the fluid ejected from the inlets will flow.

Accordingly, it is an object and feature of this invention to provide an apparatus for tempering glass having a pattern of inlet passages and exhaust passages therein for minimizing static or low float conditions and maximizing impingement of fluid on the glass whereby a sheet of glass may be tempered to a degree of uniformity heretofore unattainable.

Another object and feature of the instant invention is to provide an apparatus for tempering a sheet of glass having a pattern of inlet passages and exhaust passages therein whereby the fluid impinges the glass sheet as it is ejected from the inlet passages and impinges the glass sheet as it flows into the exhaust passages.

In general, these and other objects and features of this invention may be attained by an apparatus including first and second oppositely disposed flow directing units, each having a first wall with an outer surface which is substantially parallel and spaced from the outer surface of the first wall of the other unit whereby a sheet of glass may be disposed therebetween. Duct means supply fluid to the plenum chamber formed within each unit. The first walls of each of the units each have a plurality of inlet passages therethrough for supplying fluid from the plenum chamber of the respective units to the space between the first walls. The first walls also include a plurality of exhaust passages for exhausting fluid from the space between the walls to atmosphere. There is also included means surrounding each of the exhaust passages and extending from the surface of each of the first walls so that fluid from the inlet passages impinges a sheet of glass disposed between the first walls and subsequently impinges the sheet by flowing over the means and into the exhaust passages. More specifically, the means surrounding each of the exhaust passages may take the form of a washer-like element surrounding each exhaust passage or a tube-like member extending from the surface of each unit. The washer-like member has a plurality of ridges disposed about each exhaust passage to force the fluid, as the fluid flows to the respective exhaust passages, to successively flow toward the sheet of glass as the fluid successively flows over each of the ridges. Alternatively or additionally, the means surrounding each of the exhaust passages may be formed by a tube-like member which forms the respective exhaust passages and extends from the surface of the first wall such that fluid flowing to the exhaust passage must flow over the end of the tube-like member and into the exhaust passage, thus impinging the glass adjacent the exhausts. In addition, there are at least twice as many inlet passages as exhaust passages, and each inlet passage is equally spaced from at least three surrounding exhaust passages so that the fluid from each inlet passage interacts with the fluid from adjacent inlet passages along lines joining the centers of the surrounding exhaust passages. Thus, in accordance with the instant invention, the impingement of cooling fluid upon a sheet of glass in tempering the sheet of glass is greatly increased, thereby greatly increasing the heat transfer from the glass to the fluid.

Other objects and attendant advantages of the present invention will be readily appreciated as the same becomes better understood by reference to the following detailed description when considered in connection with the accompanying drawings wherein:

FIGURE 4 is a perspective view partly cut away of a flow directing unit utilized in the apparatus illustrated in FIGURE 1;

FIGURE 5 is an enlarged fragmentary view of an alternative embodiment of a flow directing unit constructed in accordance with the instant invention;

FIGURE 6 is a fragmentary cross-sectional view taken substantially along line 6—6 of FIGURE 5;

FIGURE 7 is an enlarged fragmentary view of a portion of a flow directing unit illustrated in FIGURES 1 through 4 and showing a sheet of glass floating thereover; and FIGURE 8 is an enlarged fragmentary cross-sectional view of another embodiment of a flow directing unit which may be utilized and showing a sheet of glass floating thereover.

Figure 1:
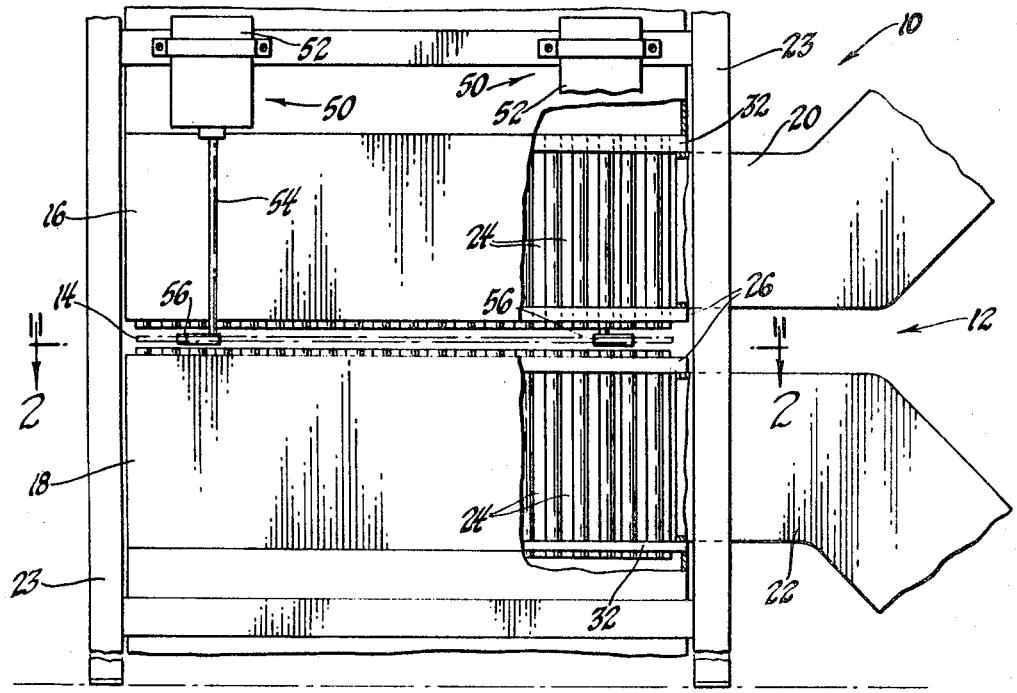
FIGURE 1 illustrates a preferred embodiment of the apparatus of the instant invention.

Referring now to the drawings, wherein like numerals indicate like or corresponding parts throughout the several views, an apparatus for transferring heat between a sheet of glass and a fluid is generally shown at 10. The heat treating apparatus 10 is frequently referred to as a blasthead and includes a flow control means, generally shown at 12, for impinging a fluid on a sheet of glass 14 from a plurality of inlet passages 28 and for subsequently impinging the fluid on the sheet of glass 14 adjacent a plurality of exhaust passages 30. The flow control means 12 includes the first and second oppositely disposed flow directing units 16 and 18 and the duct means, which includes the ducts 20 and 22. The units 16 and 18 are secured to the framework 23 by an appropriate means such as welding, bolting, or the like.

Each of the flow directing units 16 and 18 has a plenum chamber 24 therein, and the ducts 20 and 22 supply fluid to the plenum chamber 24. The units 16 and 18 each have a first wall 26 which is substantially parallel and spaced from the first wall 26 of the other unit. The sheet of glass 14 is disposed in the space between the walls 26 of the respective units 16 and 18.

The plurality of inlet passages 28 are disposed in each of the walls 26 for supplying fluid from the plenum chamber 24 to the space between the walls 26 for impingement upon the sheet of glass 14. The plurality of exhaust passages 30 are formed by tubes which extend through the respective walls 26, through the respective plenum chambers 24, and through the second walls 32, and thereby extend through the respective units 16 and 18 so that the fluid, after impinging the sheet of glass 14, flows through the exhaust passages 30 to atmosphere.

There is included means, generally shown at 40, surrounding each of the exhaust passages 30 so that, as the fluid is ejected from the inlet passages 28, it impinges the sheet of glass 14 and subsequently impinges the sheet of glass 14 as it flows over the means 40 to the exhaust passages 30. More specifically, the means 40 for surrounding the exhaust passages 30 may take the form of one of various embodiments, the first embodiment being the extension of the tube-like member forming the exhaust passages 30 upwardly from the upper surface of the wall 26, as illustrated in FIGURES 1 through 4 and 7. Alternatively, the means 40 for surrounding the exhaust passages 30 may take the form of a washer-like member 42 alone, as illustrated in FIGURES 5 and 6, or the washer-like member 42 and the extended tube as illustrated in FIGURE 8. Referring more specifically to FIGURE 7, wherein the tubes forming the exhaust passages 30 extend upwardly from the surface of the wall 26, the fluid flow is illustrated by the arrow lines. The fluid flows upwardly through the inlet passages 28, impinges the glass 14, and bounces back toward the upper surface of the wall 26. The fluid then moves substantially laterally or parallel to the sheet of glass 14 toward the exhaust passages 30. When the fluid reaches the exhaust passage it moves upwardly toward the sheet of glass to flow over the upper extremity of the tubes forming the exhaust passages 30. As the fluid flows over the upper extremity of the tubes forming the exhaust passages 30, it impinges the glass and reverses direction to flow into the exhaust passages 30. Hence, the fluid is caused to impinge the glass adjacent each of the exhaust passages 30. In the embodiments illustrated in FIGURES 5, 6 and 8, the washer-like member 42 has a plurality of ridges 44 for forcing the fluid to successively flow toward the sheet of glass 14 as the fluid flows over the ridges 44 to the exhaust passages 30. In the embodiment of FIGURE 8, the extended tube also forces the fluid flow to impinge the glass sheet. As illustrated by the arrow lines, the fluid flow is ejected from the inlet passages 28 and impinges the glass 14. After impinging the glass 14, the fluid bounces off the glass toward the upper surface of the wall 26 and moves substantially parallel to the glass sheet 14 toward an adjacent exhaust passage 30. As the fluid approaches the washer-like member 42, it is forced upward toward the sheet of glass 14 as it moves over each of the respective ridges 44; thus, the fluid successively impinges the glass sheet 14 as it passes over the respective ridges 44 of the washer-like member 40.

In the embodiments illustrated, the upper extremity of the means 40 surrounding the exhaust passages; to wit, the upper extremities of the tubes forming the exhaust passages 30 and/or the upper extremities of the ridges 44 of the washer-like members 42, form a restriction with the glass sheet 14 so that back pressure is increased in the areas between each inlet passage 28 and the surrounding exhaust passages 30 to support the glass sheet 14 above and out of contact with the upper extremities of the means 40.

To increase the impingement of the fluid on the glass 14, a second plurality of inlet passages 29, as illustrated in FIGURES 5 and 6, may be utilized. Each of the inlet passages 29 is disposed centrally within an exhaust passage 30 and extends from the plenum chamber 24 to provide fluid flow therethrough from the plenum chamber 24 to the space between the units.

Figure 2:
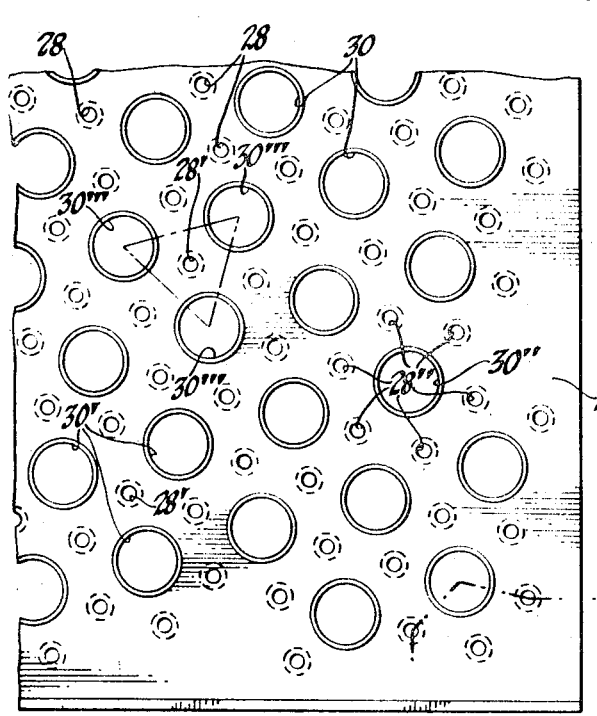
FIGURE 2 is an enlarged fragmentary cross-sectional view taken substantially along line 2—2 of FIGURE 1.
Figure 3:
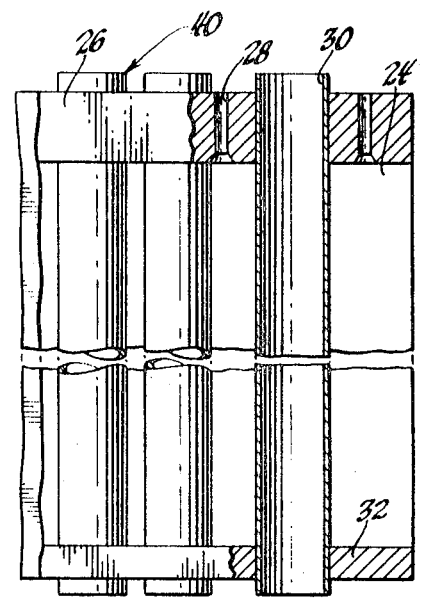
FIGURE 3 is a fragmentary cross-sectional view taken substantially along line 3—3 of FIGURE 2.

The utilization of means 40 surrounding the exhaust passages 30 is preferably utilized in combination with the inlet and exhaust passage patterns which are shown in FIGURES 2 and 5. These patterns have been found to provide optimum flow conditions for transferring heat between a fluid and a sheet of glass and form the basis of copending application S.N. 548,737, filed May 9, 1966, in the name of Ronald A. McMaster and assigned to the assignee of the instant invention.

In the pattern illustrated in FIGURE 2, there are twice as many inlet passages 28 as exhaust passages 30 per unit area of the walls 26 and each inlet passage 28 is equally spaced from three surrounding exhaust passages. More specifically, the inlet passage 28' is equally spaced from the three exhaust passages 30'. In addition, the distance from the periphery of each inlet passage 28 to the periphery of any one of the surrounding exhaust passages 30 is less than the distance to the periphery of the nearest inlet passage 28; thus, the adverse effects of the fluid supply through each inlet passage 28 on the fluid supplied through adjacent inlet passages 28 is minimized to increase heat transfer to the fluid from the glass 14. Also, each exhaust passage 30 is surrounded by six equally spaced inlet passages 28. More specifically, and by way of example, the exhaust passage 30" is surrounded by the six equally spaced inlet passages 28". Furthermore, each inlet passage 28 is positioned in an offset and overlapping relationship with respect to the adjacent inlet passages, both in a direction longitudinally of the respective units 16 and 18 and in a direction transverse the longitudinal axis of the respective units 16 and 18. Hence, each exhaust passage 30 is also positioned in an offset and overlapping relationship with respect to adjacent exhaust passages 30, both in a direction longitudinally of the units 16 and 18 and in a direction transverse the longitudinal axis of the units 16 and 18. The overlapping relationship of the inlet passages and the exhaust passages is important when the glass 14 is moved relative to the units 16 and 18 to obtain uniform tempering over the entire sheet 14, which movement is more fully set forth hereinafter. In addition, the aggregate area of the exhaust passages 30 is larger than the aggregate area of the inlet passages 28 per unit area, and preferably the aggregate area of the exhaust passages 30 is at least six times the aggregate area of the inlet passages 28 in a given unit area. By providing a larger aggregate area of the exhaust passages 30 than the inlet passages 28, the back pressure in the exhaust passages 30 is minimized so that the fluid readily flows through the exhaust passages 30.

Utilization of the means 40 surrounding the exhaust passages 30 in combination with these patterns provides yet further impingement of the fluid on the glass 14. More specifically and by way of example, the inlet passage 28''' in FIGURE 2 is surrounded by the three exhaust passages 30''', and the fluid from the inlet passage 28''', having impinged the glass sheet 14, moves laterally toward the exhaust passages 30''' and toward the adjacent inlet passages. The fluid moving toward the adjacent inlet passages interacts with fluid from those adjacent inlet passages along that portion of the dotted lines joining the centers of the exhaust passages 30''' which extends between the peripheries of the exhaust passages.

Hence, in the embodiment illustrated in FIGURE 2, the fluid impings the glass sheet 14 above each respective inlet passage 28 and impinges the glass sheet 14 at the periphery of each of the exhaust passages 30. Furthermore, when the additional inlet passages 29 are utilized, fluid is also impinged on the glass sheet 14 at the center of each respective exhaust passage 30.

As illustrated in FIGURE 1, the glass sheet 14 is supported on fluid between the horizontally disposed flow directing units 16 and 18, the glass sheet 14 being supported on fluid ejected from the inlet passages 28 in the lower unit 18. It will be understood, of course, that the units 16 and 18 may be disposed vertically with a sheet of glass supported by tongs or other implements between the walls 26 of the respective units 16 and 18 for tempering.

There is also included means, generally indicated at 50, for providing repetitive or oscillatory movement of the sheet 14 relative to the flow directing units 16 and 18 to effect a substantially uniform transfer of heat over the entire sheet. As pointed out hereinbefore, the inlet passages 28 and the exhaust passages 30 are offset from one another such that a sheet moving relative to the units 16 and 18 will not pass over adjacent inlet passages or adjacent exhaust passages which are inline, which could result in striping of the sheet. The means 50 includes the motors 52 which have shafts 54 depending therefrom. A finger 56 is disposed on the lower end of each of the shafts 54. Four such motors 52 are utilized, two on each side of the apparatus (only the motors 52 on one side are shown). The fingers 56 are rotated into the space between the walls 26 by the motors 52. The fingers 56 have a microswitch (not shown) thereon so that, when the glass sheet 14 contacts the microswitch, the motors 52 are operated to rotate the shafts 54 and move the fingers 56 between the walls 26 to push the glass sheet 14 toward the opposite side of the apparatus. When the glass sheet 14 reaches the opposite side of the apparatus, it contacts the fingers 56 on the opposite side of the apparatus and is pushed in the opposite direction in the space between the walls 26. Hence, the glass sheet 14 is provided with an oscillatory or repetitive motion to increase the uniformity of the tempering over the glass sheet 14. It is to be understood, however, that many other devices may be utilized to provide relative movement between the glass sheet 14 and the apparatus. For example, the apparatus disclosed and claimed in copending application S.N. 548,752 filed May 9, 1966, in the name of Harold A. McMaster and assigned to the assignee of the instant invention may be utilized.

It will also be understood that although the instant invention has been illustrated for use in quenching or tempering glass, the invention also may be utilized to convey heat to the glass sheet.

The invention has been described in an illustrative manner and it is to be understood that the terminology which has been used is intended to be in the nature of words of description rather than of limitation.

The embodiments of the invention in which an exclusive property or privilege is claimed are defined as follows:

1. In an apparatus for transferring heat between a sheet of material such as glass and fluid as the sheet is supported on the fluid over a surface having inlet and exhaust passages therein, said inlet passages being disposed in said surface for conveying fluid for impingement on the sheet, said exhaust passages being disposed in said surface and spaced among said inlet passages, and including means for conveying fluid to said inlet passages and from said exhaust passages, the improvement comprising: an independent ridge means disposed about each of said exhaust passages and spaced from adjacent ridge means, each of said ridge means extending above said surface for projecting into the flow of fluid above said surface to subsequently redirect the fluid flow so as to impinge the sheet while flowing to said exhaust passages.

2. In an apparatus as set forth in claim 1 wherein each inlet passage is equally spaced from the three surrounding exhaust passages and each exhaust passage is equally spaced from the six surrounding inlet passages.

3. In an apparatus as set forth in claim 1 wherein each of said ridge means comprises a tube-like member extending from said surface.

4. In an apparatus as set forth in claim 1 wherein each of said ridge means comprises a member having a plurality of ridges for forcing said fluid to sucessively flow toward the sheet as the fluid successively flows over said ridges to the associated exhaust passage.

5. In an apparatus as set forth in claim 1 wherein each of said ridge means comprises a tube-like member extending from said surface to force fluid to flow toward the sheet as the fluid flows thereover and a member having a plurality of ridges for forcing the fluid to successively flow toward the sheet as the fluid successively flows over said ridges.

6. In an apparatus as set forth in claim 1 including at least one flow directing unit having spaced first and second walls with said surface being the outer surface of said first wall and duct means for supplying fluid into a plenum chamber formed between said walls of said unit, said inlet passages extending through said first wall to provide fluid communication from said plenum chamber to the exterior of said unit, said exhaust passages extending through said first wall, through said plenum chamber and through said second wall to provide a fluid flow path from adjacent said inlet passages to atmosphere.

7. In an apparatus as set forth in claim 1 wherein each of said ridge means is annularly disposed about an annular exhaust passage.

References Cited

UNITED STATES PATENTS

| 2,080,083 | 5/1937 | Magnien | 65—348 |
| 2,298,709 | 10/1942 | Long | 65—348 |
| 3,332,761 | 7/1967 | Fredley et al. | 65—182 |
| 3,332,762 | 7/1967 | McMaster et al. | 65—107 X |

S. LEON BASHORE, Primary Examiner

A. D. KELLOGG, Assistant Examiner

U.S. Cl. X.R.

65—25, 104, 107, 114, 348; 214—1